(12) United States Patent
Lester et al.

(10) Patent No.: US 10,491,399 B2
(45) Date of Patent: Nov. 26, 2019

(54) CRYPTOGRAPHIC METHOD FOR SECURE COMMUNICATIONS

(71) Applicant: Cyph, Inc., Dover, DE (US)

(72) Inventors: Ryan Lester, Dover, DE (US); Bryant Zadegan, Dover, DE (US)

(73) Assignee: CYPH, INC., Dover, DE (US)

( * ) Notice: Subject to any disclaimer, the term of this patent is extended or adjusted under 35 U.S.C. 154(b) by 341 days.

(21) Appl. No.: 14/841,318

(22) Filed: Aug. 31, 2015

(65) Prior Publication Data

US 2016/0197896 A1 Jul. 7, 2016

Related U.S. Application Data

(60) Provisional application No. 62/100,676, filed on Jan. 7, 2015.

(51) Int. Cl.

| | |
|---|---|
| *H04L 9/32* | (2006.01) |
| *H04L 29/06* | (2006.01) |
| *H04L 5/00* | (2006.01) |
| *H04L 29/08* | (2006.01) |
| *H04L 12/58* | (2006.01) |
| *G06F 21/60* | (2013.01) |
| *H04L 9/08* | (2006.01) |
| *G06F 8/60* | (2018.01) |
| *H04W 12/10* | (2009.01) |
| *G06F 21/45* | (2013.01) |

(52) U.S. Cl.
CPC ............ *H04L 9/3247* (2013.01); *G06F 8/60* (2013.01); *G06F 21/45* (2013.01); *G06F 21/606* (2013.01); *H04L 5/0037* (2013.01); *H04L 9/08* (2013.01); *H04L 9/0861* (2013.01); *H04L 9/321* (2013.01); *H04L 9/3215* (2013.01); *H04L 9/3228* (2013.01); *H04L 51/046* (2013.01); *H04L 51/16* (2013.01); *H04L 63/0281* (2013.01); *H04L 63/0435* (2013.01); *H04L 63/0442* (2013.01); *H04L 63/061* (2013.01); *H04L 63/065* (2013.01); *H04L 63/08* (2013.01); *H04L 63/0838* (2013.01); *H04L 63/123* (2013.01); *H04L 63/18* (2013.01); *H04L 67/02* (2013.01); *H04L 67/10* (2013.01); *H04L 67/141* (2013.01); *H04L 67/146* (2013.01); *H04W 12/10* (2013.01); *H04L 67/42* (2013.01)

(58) Field of Classification Search
CPC ....... H04L 9/3247; H04L 9/08; H04L 9/0861; H04L 9/321; H04L 9/3215; H04L 9/3228; H04L 51/16; H04L 63/0435; H04L 63/0442; H04L 63/061; H04L 63/065; H04L 63/08; G06F 8/60; G06F 21/45; G06F 21/606
See application file for complete search history.

(56) References Cited

U.S. PATENT DOCUMENTS

| | | | | |
|---|---|---|---|---|
| 2010/0100721 | A1* | 4/2010 | Su | G06F 11/1456 713/150 |
| 2010/0250939 | A1* | 9/2010 | Adams | G06F 11/1458 713/171 |
| 2011/0307695 | A1* | 12/2011 | Slater | G06F 17/30528 713/163 |

* cited by examiner

Primary Examiner — Tamara T Kyle
(74) Attorney, Agent, or Firm — Brundidge & Stanger, P.C.

(57) ABSTRACT

Embodiments herein include, for example, a method that includes signing onto an secure communications system; sending a communication message; and transmitting every messages to all devices in a device group, before displaying any message sent or received.

1 Claim, 10 Drawing Sheets

CRYPTOGRAPHIC METHOD FOR SECURE COMMUNICATIONS

CROSS-REFERENCE TO RELATED APPLICATIONS

This application claims priority to U.S. Provisional Application No. 62/100,676, entitled "CRYPTOGRAPHIC METHOD FOR SECURE COMMUNICATIONS" and filed Jan. 7, 2015.

The subject matter of the present application is related to that disclosed in the following co-pending applications:

Ser. No. 14/841,327, entitled "CROSS-CLIENT COMMUNICATION METHOD" and filed Aug. 31, 2015 and claiming priority to U.S. Provisional Application No. 62/100,674, filed on Jan. 7, 2015;

Ser. No. 14/841,310, entitled "METHOD OF DENIABLE ENCRYPTED COMMUNICATIONS" and filed Aug. 31, 2015 and claiming priority to U.S. Provisional Application No. 62/100,682, filed on Jan. 7, 2015;

Ser. No. 14/841,281, entitled "ENCRYPTED GROUP COMMUNICATION METHOD" and filed Aug. 31, 2015 and claiming priority to U.S. Provisional Application No. 62/100,684, filed on Jan. 7, 2015;

Ser. No. 14/841,310, entitled "METHOD OF GENERATING A DENIABLE ENCRYPTED COMMUNICATIONS VIA PASSWORD ENTRY" and filed Aug. 31, 2015 and claiming priority to U.S. Provisional Application No. 62/100,686, filed on Jan. 7, 2015;

Ser. No. 14/841,288, entitled "MULTI-KEY ENCRYPTION METHOD" and filed Aug. 31, 2015 and claiming priority to U.S. Provisional Application No. 62/100,688, filed on Jan. 7, 2015;

Ser. No. 14/841,302, entitled "METHOD OF EPHEMERAL ENCRYPTED COMMUNICATIONS" and filed Aug. 31, 2015 and claiming priority to U.S. Provisional Application No. 62/100,689, filed on Jan. 7, 2015;

Ser. No. 62/100,692, entitled "METHOD OF MULTI-FACTOR AUTHENTICATION DURING ENCRYPTED COMMUNICATIONS" and filed Aug. 31, 2015 and claiming priority to U.S. Provisional Application No. 62/100,692, filed on Jan. 7, 2015;

Ser. No. 14/841,296, entitled "METHOD OF USING SYMMETRIC CRYPTOGRAPHY FOR BOTH DATA ENCRYPTION AND SIGN-ON AUTHENTICATION" and filed Aug. 31, 2015 and claiming priority to U.S. Provisional Application No. 62/100,693, filed on Jan. 7, 2015. and Ser. No. 15/001,015, entitled "SYSTEM AND METHOD OF CRYPTOGRAPHICALLY SIGNING WEB APPLICATIONS" and filed Aug. 31, 2015 and claiming priority to U.S. Provisional Application No. 62/104,307, filed on Jan. 16, 2015.

The content of the above applications are incorporated by reference in their entirety.

BACKGROUND

Technical Field

The embodiments herein generally relate to cryptography, and, more particularly, to a method of cryptographically securing digital communications.

Description of the Related Art

Information such as personal data and other sensitive information may be passed across a network such as the Internet, for example to provide credential information, payment information, or personal account management information. To protect sensitive information, the information can be transmitted over a secure transmission connection provided by an encryption system.

Conventional encryption systems are often difficult to use and thereby introduce weaknesses in the overall systems. For example, asymmetric encryption relies on complex mathematics applied to private and public information (e.g., private and public keys) and is inherently inefficient. Symmetric encryption is significantly more efficient, but relies on secret information (e.g., a password, passphrase, or private key) that must remain private between all persons or devices with authorized access to the encrypted data.

The difficulties of conventional encryption systems increase when the secret information is publicly known. For example, when the secret information is publicly known, the entire encryption system becomes compromised and must be revised (e.g., resetting passwords, passphrases, private keys, etc.). Since various methods to obtain this secret information are well known and frequently used—techniques such as such as man-in-the-middle attacks, social engineering, etc.—it is therefore desirable to reduce exposure to an encryption system's private information and thereby reduce the potential attack surface of such an encryption system.

SUMMARY

In view of the foregoing, an embodiment herein provides a method, comprising: signing onto an secure communications system, comprising: downloading a symmetrically encrypted blob from a server, wherein the encrypted data block comprises a server-stored secondary password and a server-stored shared-symmetric key; decrypting the encrypted blob with a locally-stored shared-symmetric key; signing onto at least one of a server or service using the server-stored secondary password; generating a secondary password, wherein the generated secondary password is different than the server-stored secondary password; and overwriting the server-stored secondary password with the generated secondary password; sending a communication message, comprising: encrypting a message with the server-stored shared-symmetric key; and decrypting a received message with the server-stored shared-symmetric key; and transmitting every messages to all devices in a device group, before displaying any message sent or received, comprising: encrypting each message using a device group shared symmetric key known by all devices in the device group as an encrypted group message and transmitting the encrypted group message to all the devices in the device group, wherein upon receiving the encrypted group message, each device of the device group decrypts the encrypted group message with the device group shared symmetric key and displays the encrypted group message, encrypting the first encrypted message using a second device group shared symmetric key known by all devices in the second device group as a second encrypted group message and transmitting the second encrypted group message to all the devices in the second device group, wherein upon receiving the second encrypted group message, each device of the second device group decrypts the second encrypted group message with the second device group shared symmetric key and displays the second encrypted group message; encrypting the first encrypted message using a second device group shared symmetric key known by all devices in the second device group as a second encrypted group message and transmitting the second encrypted group message to all the devices in the second device group, wherein upon receiving the second encrypted group message, each device of the second device group decrypts the second encrypted group message with the second device group shared symmetric key and displays the second encrypted group message.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
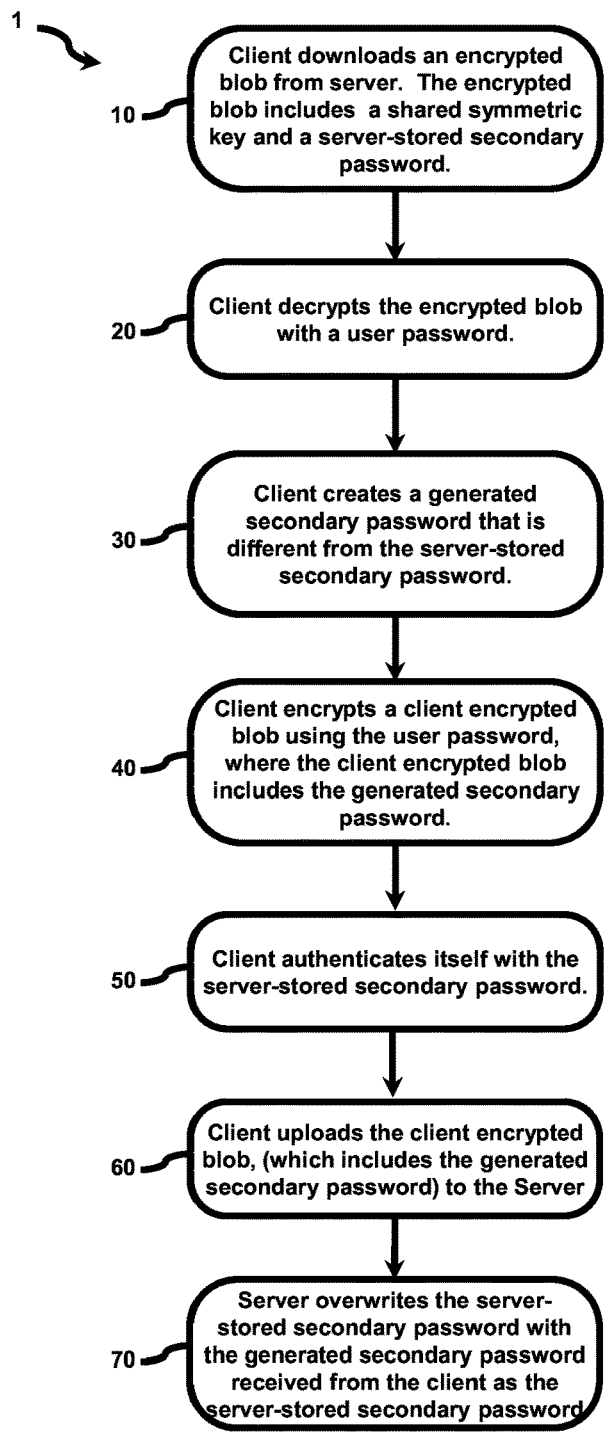
FIG. 1A illustrates a flow diagram illustrating a method of secure sign-on for cryptographically securing digital communications according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of secure communication with persistence, propagation and destructibility of messages. For example, a user (e.g., "Alice") would like to privately chat with another user (e.g., on the Cyph™ secure messaging platform) while reducing the attack surface of the communication. According to the embodiments described herein, the private chat permits secure cross-communication between all the computing devices associated with the user (e.g., mobile computing devices (such as laptops, smartphones and tablets, etc.) and stationary computing devices (such as desktops, smart TVs, etc.)) during the private chat while maintaining perfect forward secrecy and deniable authentication. Furthermore, embodiments described herein provide additional layers of indirection and allow the user to securely encrypt her sensitive data (e.g., her chat history) stored in a remote (and possibly untrustworthy) location and permit her to retain effective control over that sensitive data. Referring now to the drawings, and more particularly to FIGS. 1A through 8 where similar reference characters denote corresponding features consistently throughout the figures, there are shown preferred embodiments.

Figure 9:
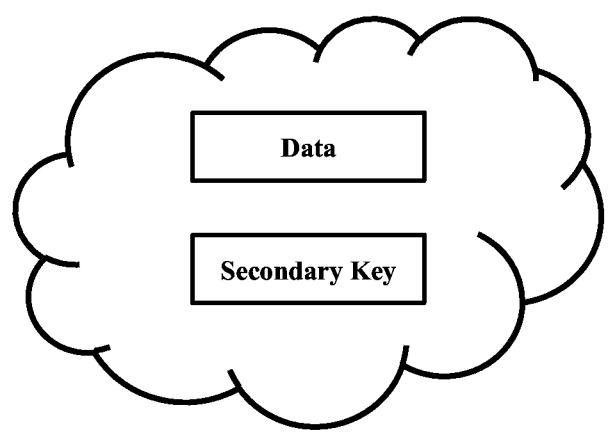
FIG. 9 illustrates a schematic diagram of an encrypted blob according to an embodiment herein.
Figure 10:
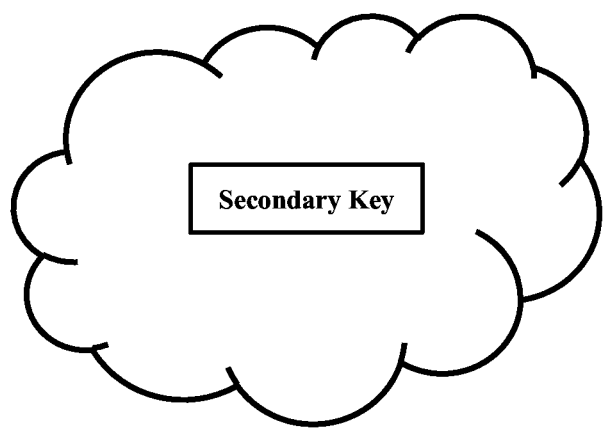
FIG. 10 illustrates a schematic diagram of another encrypted blob according to an embodiment herein.

FIG. 1A illustrates a flow diagram of a method of secure sign-on for cryptographically securing digital communications according to an embodiment herein. As shown in FIG. 1, a Client (e.g., a computing device shown in FIGS. 7 and 8) downloads an encrypted blob (e.g., the encrypted blob shown in FIG. 9) from a Server (e.g., a computing device shown in FIGS. 7 and 8) in step 10. According to one embodiment herein, the encrypted blob includes a shared symmetric key for near real-time communications and a server-stored secondary password. Alternatively, the encrypted blob only contains the server-stored secondary password (e.g., the encrypted blob shown in FIG. 10). In step 20, the Client decrypts the encrypted blob with a user password (e.g., the passphrase that Alice has memorized). In step 30, the Client creates a generated secondary password that is different from the server-stored secondary password and then encrypts a client encrypted blob using the user password, where the client encrypted blob includes the generated secondary password in step 40.

In step 50, the Client authenticates itself with the server-stored secondary password. For example, Alice may sign onto Server to gain access to Server's resources, Alice may authorize her Client device to sign onto Server or Alice may sign onto a service or a platform (such as Cyph™ secure messaging platform). However, the embodiments shown in FIG. 1A and illustrated by step 50 are not limited to these examples. Optionally, in step 60, the Client uploads the client encrypted blob, (which includes the generated secondary password) to the Server and Server overwrites the server-stored secondary password with the generated secondary password received from the Client as the server-stored secondary password in step 70.

Figure 1B:
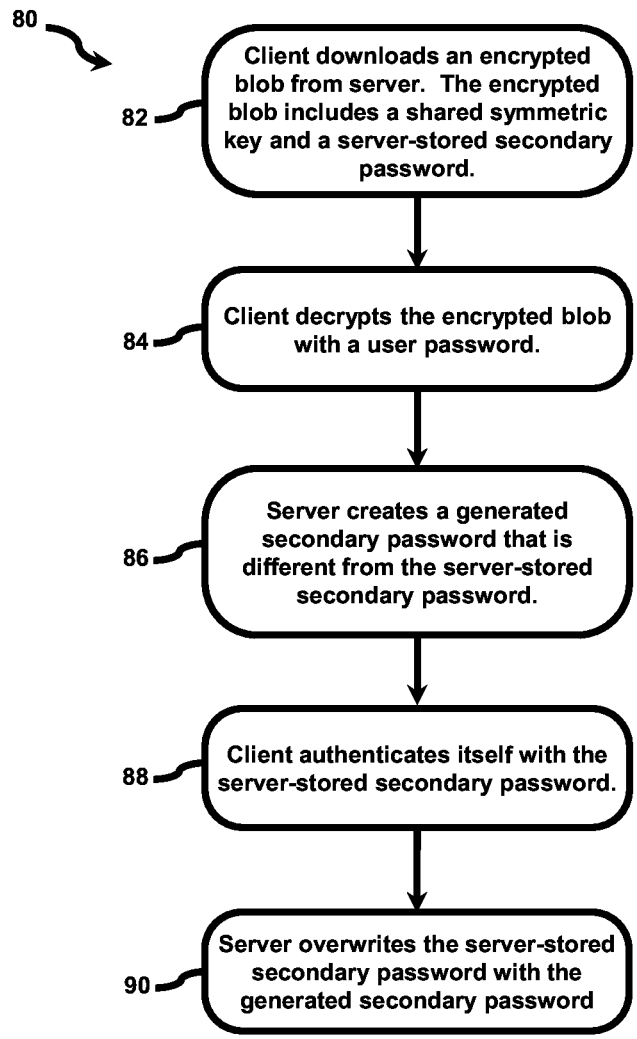
FIG. 1B illustrates a flow diagram illustrating an alternative method of secure sign-on cryptographically securing digital communications according to an embodiment herein.

FIG. 1B illustrates a flow diagram of an alternative method of secure sign-on for cryptographically securing digital communications according to an embodiment herein. As shown in FIG. 1B, a Client downloads an encrypted blob from a Server in step 82. According to one embodiment herein, the encrypted blob includes a shared symmetric key and a server-stored secondary password. Alternatively, the encrypted blob only contains the server-stored secondary password. In step 84, the Client decrypts the encrypted blob with a user password. In step 86, the Server creates a generated secondary password that is different from the server-stored secondary password. In step 88, the Client authenticates itself with the server-stored secondary password. For example, Alice may sign onto Server to gain access to Server's resources, Alice may authorize her Client device to sign onto Server or Alice may sign onto a service or a platform (such as Cyph™ secure messaging platform). However, the embodiments shown in FIG. 1B and illustrated by step 88 are not limited to these examples. Finally, in step 90, Server overwrites the server-stored secondary password with the generated secondary password as a new server-stored secondary password, which would be send to Client next time Client requests sign-on authorization (e.g., as shown in step 82).

Figure 2:
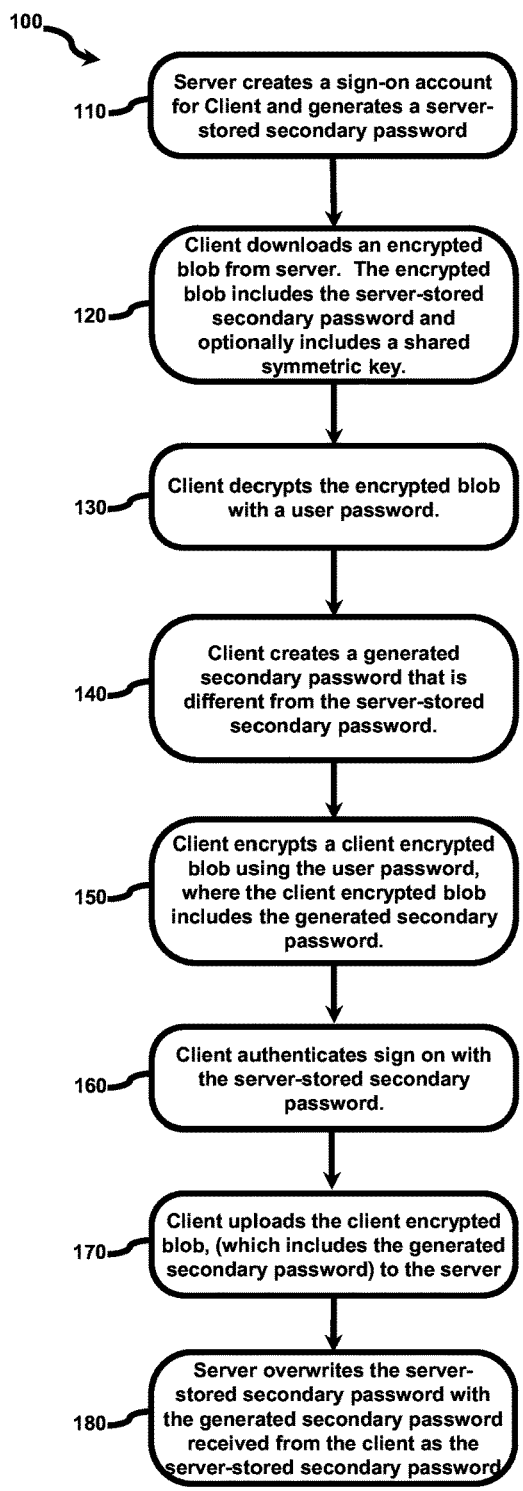
FIG. 2 is a flow diagram illustrating a preferred method of creating a secure sign-on account according to an embodiment herein.

FIG. 2 illustrates a flow diagram of creating a secure sign-on account according to an embodiment herein. As shown in FIG. 2, in step, 110, a Server creates a sign-on account for Client (e.g., a user account for Alice on the Cyph™ secure messaging platform) and Server generates a server-stored secondary password. In step 120, a Client downloads an encrypted blob from a Server. According to one embodiment herein, the encrypted blob includes arbitrary sensitive data and the server-stored secondary password created in step 110. Alternatively, the encrypted blob only contains the server-stored secondary password created in step 110. In step 130, the Client decrypts the encrypted blob with a user password (e.g., the passphrase that Alice has memorized). In step 140, the Client creates a generated secondary password that is different from the server-stored secondary password and then encrypts a client encrypted blob using the user password, where the client encrypted blob includes the generated secondary password in step 150.

In step 160, the Client authenticates itself with the server-stored secondary password. For example, Alice may sign onto Server to gain access to Server's resources, Alice may authorize her Client device to sign onto Server or Alice may sign onto a service or a platform (such as Cyph™ secure messaging platform). However, the embodiments shown in FIG. 2 and illustrated by step 160 are not limited to these examples. Optionally, in step 170, the Client uploads the client encrypted blob, (which includes the generated secondary password) to the Server and Server overwrites the server-stored secondary password (created in step 110) with the generated secondary password received from the Client as the server-stored secondary password in step 180. Alternatively, Server could generate the new "generated password" in a manner similar to FIG. 1B. Moreover, according to one embodiment herein, either embodiment of FIG. 2 described above is restricted to the account creation and subsequent sign-on requests follow the embodiments of FIG. 1 (e.g., FIG. 1A or FIG. 1B).

Figure 3:
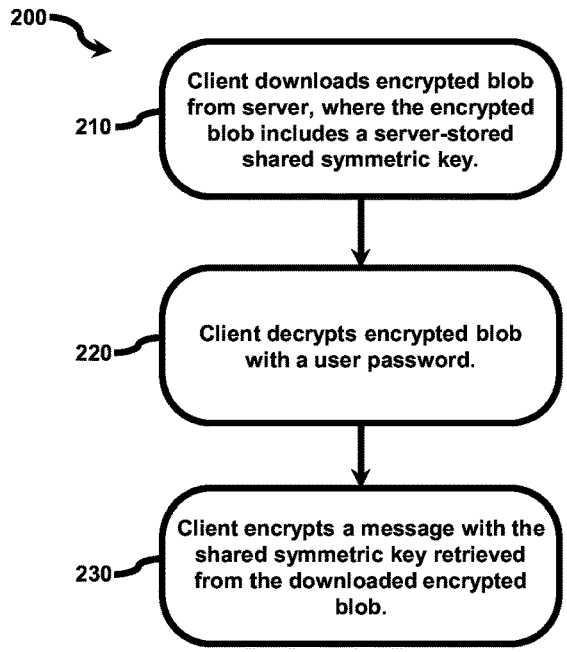
FIG. 3 illustrates a flow diagram illustrating a method of encrypting data according to an embodiment herein.

According to one embodiment herein, after a user (e.g., "Alice") signs onto a service or a platform (such as Cyph™ secure messaging platform) using the method of FIG. 1A or 1B, she begins sending secure messages that are persistently stored. FIG. 3 illustrates a flow diagram illustrating a method 200 of encrypting data according to an embodiment herein. As shown in FIG. 3, in 210, a Client downloads encrypted blob from Server, where the encrypted blob includes a server-stored secondary key. According to another embodiment herein, the encrypted blob of step 210 includes the shared symmetric key of step 10 in FIG. 1A or step 82 of FIG. 1B. In step 220, Client decrypts encrypted blob with user password (e.g., a passphrase that Alice has memorized, such as "correct horse battery staple"). According to an alternative embodiment herein, the user decrypts the encrypted blob with the secondary password described in FIGS. 1A and 1B. Finally, in step 40, Client encrypts a message with the sever-stored secondary key of step 210 retrieved from the downloaded encrypted blob, and transmits the message.

Figure 4:
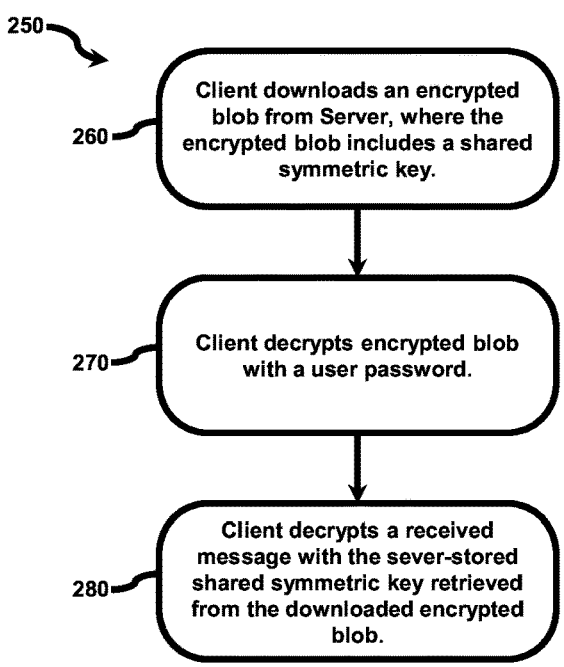
FIG. 4 illustrates a flow diagram illustrating a method of decrypting data according to an embodiment herein.

FIG. 4 illustrates a flow diagram illustrating a method 250 of decrypting data according to an embodiment herein. As shown in FIG. 4, in step 260, a Client downloads an encrypted blob from server, where the encrypted blob includes a server-stored secondary key. For example, Alice may sign onto a service or a platform (such as Cyph™ secure messaging platform). According to another embodiment herein, the encrypted blob of step 260 includes the shared symmetric key of step 10 in FIG. 1A or step 82 of FIG. 1B. In step 270, the Client decrypts encrypted blob with a user password (e.g., a passphrase that Alice has memorized). According to an alternative embodiment herein, the user decrypts the encrypted blob with the secondary password described in FIGS. 1A and 1B. Finally, in step 280, Client decrypts a received message with the sever-stored secondary key retrieved from the downloaded encrypted blob.

Figure 5:
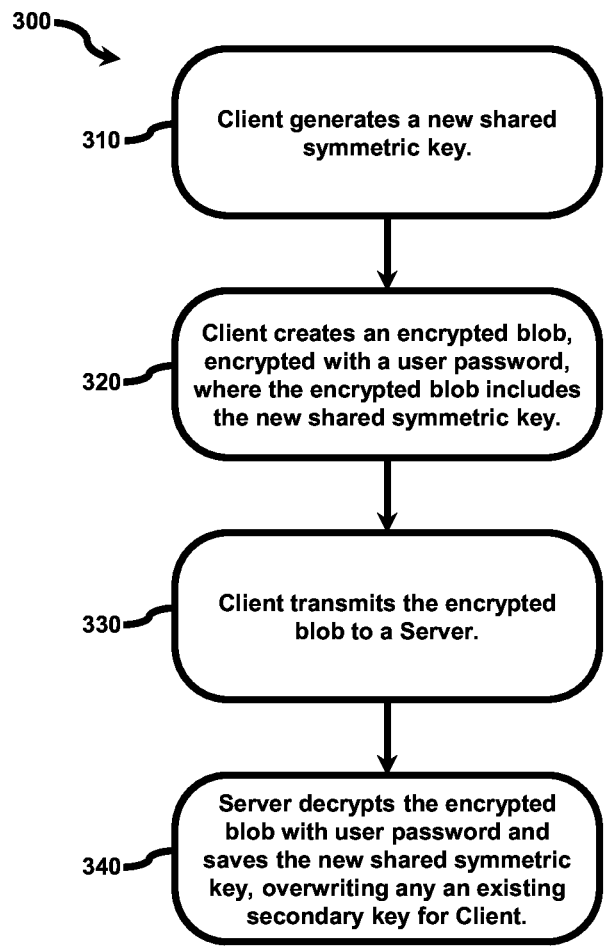
FIG. 5 is a flow diagram illustrating a destroying encrypted data according to an embodiment herein.

FIG. 5 is a flow diagram illustrating a method 300 of destroying encrypted data according to an embodiment herein. As shown in FIG. 5, step 310 includes a Client generating a new secondary key. In step 320, the Client creates an encrypted blob, encrypted with a user password (e.g., the passphrase that Alice has memorized for steps 30 and 70), where the encrypted blob includes the new secondary password generated in step 310. According to an alternative embodiment herein, the user encrypts the encrypted blob with the secondary password described in FIGS. 1A and 1B. Step 330 of FIG. 5 includes the Client transmitting the encrypted blob to a Server and step 340 includes Server decrypting the encrypted blob with user password and saves the new secondary key, overwriting any an existing secondary key for Client.

Figure 6:
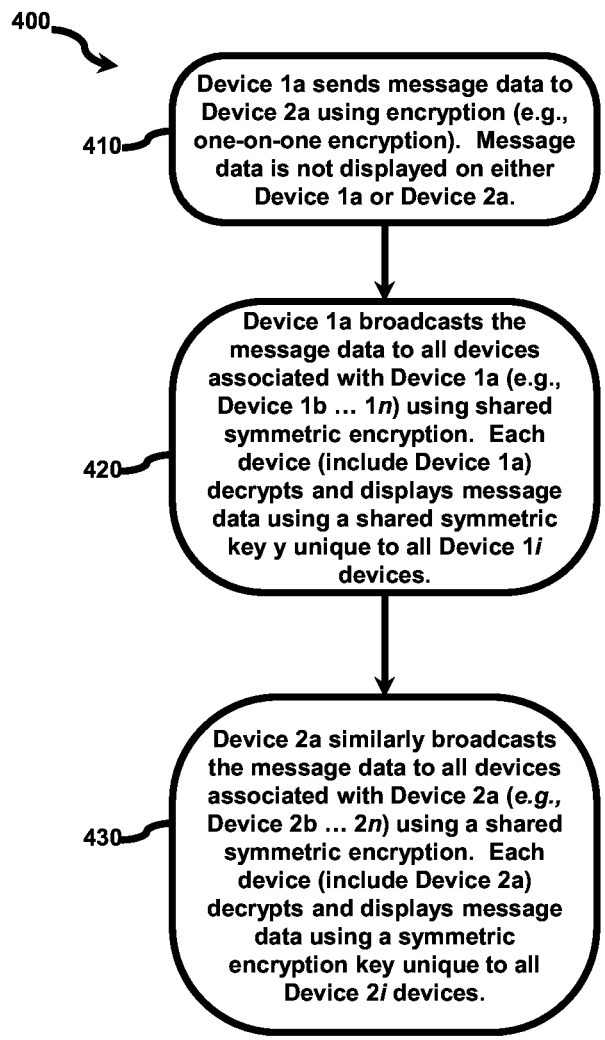
FIG. 6 illustrates a flow diagram illustrating a method of cross-client communication according to an embodiment herein

FIG. 6 illustrates a flow diagram illustrating a method 400 of encrypting data according to an embodiment herein. As shown in FIG. 6, in step 410, Device 1a (e.g., a computing device shown in FIGS. 7 and 8) associated with a first user (e.g., Alice) sends message data to Device 2a associated with a second user (e.g., Bob) using encryption (e.g., one-on-one encryption). In step 410, the message data is not displayed on either Device 1a or Device 2a. Step 420 includes Device 1a broadcasts the message data to all devices associated with Device 1a (e.g., all devices associated with Alice's user account on the Cyph™ secure messaging platform, such as Device 1b . . . 1n) using a shared symmetric encryption. According to one embodiment herein, the shared symmetric encryption of step 420 includes the shared symmetric key of step 10 in FIG. 1A or step 82 of FIG. 1B. The shared symmetric encryption system used to communication to each of Devices 1a . . . 1n may use secret information that Alice has knowledge of (e.g., a passphrase that Alice has memorized) or secret information that Alice does not know. For example, the secondary password described above in reference to FIGS. 1A and 1B. In step 420, each device (include Device 1a) decrypts and displays message data using symmetric encryption key (e.g., the secret information) unique to all the Device 1i devices. Finally, in step 430, Device 2a associated with Bob similarly broadcasts the message data to all devices associated with Device 2a (e.g., Device 2b . . . 2n) using a shared symmetric encryption. Each device (include Device 2a) decrypts and displays message data using symmetric encryption key unique to all Device 2i devices.

Figure 7:
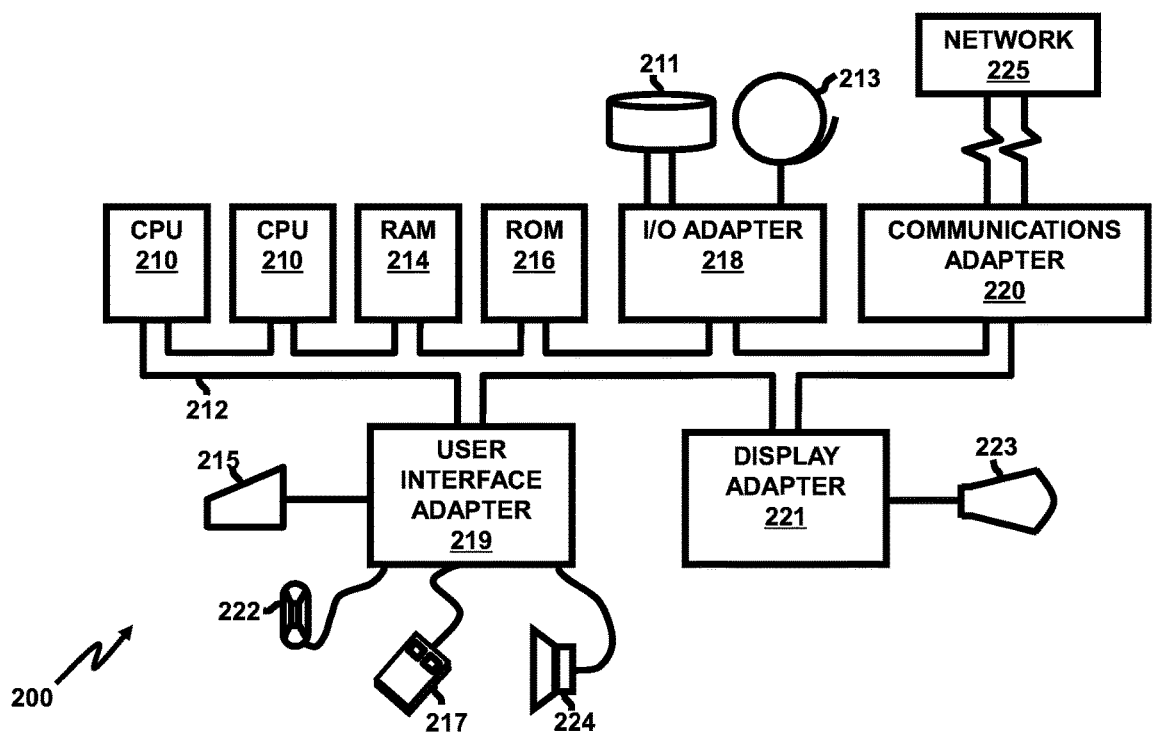
FIG. 7 illustrates a schematic diagram of a computer architecture used in accordance with the embodiments herein.

FIG. 7 illustrates an implementation of an exemplary networking environment (e.g., cloud computing environment 500) for the embodiments described herein is shown and described. The cloud computing environment 500 may include one or more resource providers 502 a, 502 b, 502 c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504 a, 504 b, 504 c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
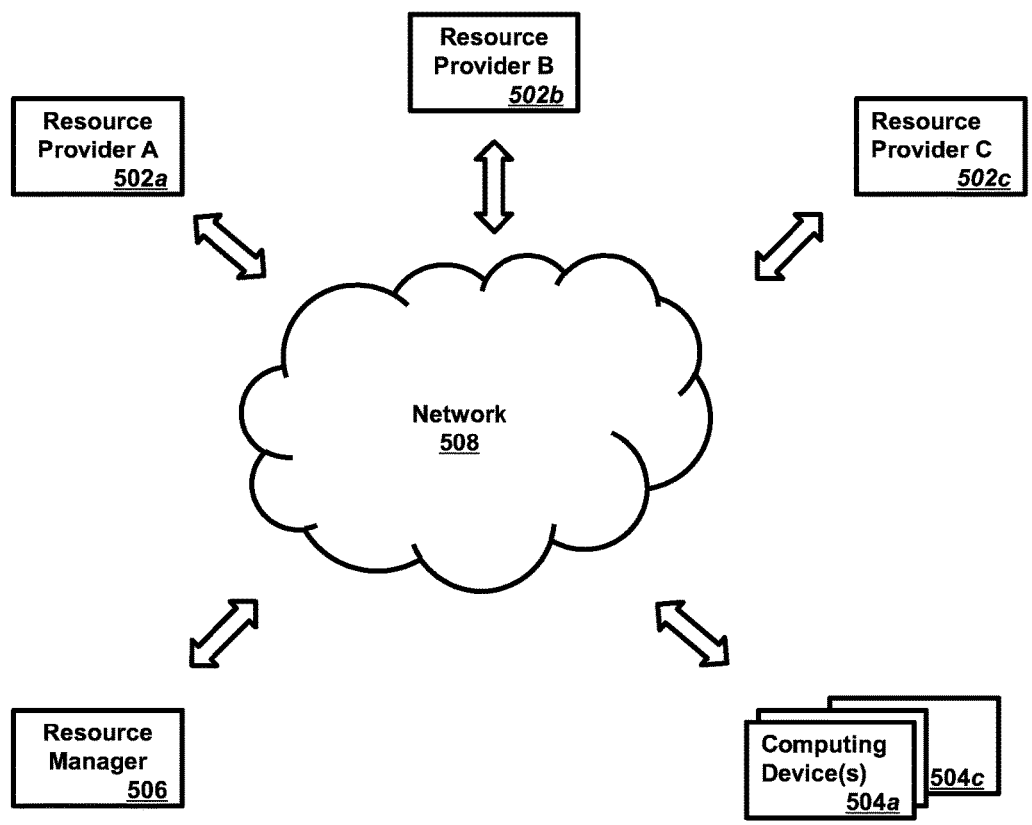
FIG. 8 illustrates a schematic diagram of a network architecture used in accordance with the embodiments herein.

A representative hardware environment for practicing the embodiments herein is depicted in FIG. 8. This schematic drawing illustrates a hardware configuration of an information handling/computer system 600 in accordance with the embodiments herein. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments herein. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

For example, FIG. 8 includes exemplary embodiments of a computing device and a mobile computing device that can be used to implement the techniques described in this disclosure. As a computing device, system 600 is intended to represent various forms of digital computers, such as laptops, desktops, workstations, personal digital assistants, servers, blade servers, mainframes, and other appropriate computers. As a mobile computing device, system 600 is intended to represent various forms of mobile devices, such as personal digital assistants, cellular telephones, smartphones, and other similar computing devices. The components shown here, their connections and relationships, and their functions, are meant to be examples only, and are not meant to be limiting.

Thus, as a computing device, system 600 includes a processor (e.g., CPUs 610), a memory 614, storage units (e.g., ROM 616, disk units 611, tape drives 613), a high-speed interface 618 connecting to the memory 614 and multiple high-speed expansion ports 619, and a low-speed interface (not shown) connecting to a low-speed expansion port (not shown) and a storage device. Each of the processors, the memory 614, the storage device, the high-speed interface 618, the high-speed expansion ports 619, and the low-speed interface, are interconnected using various busses (e.g., bus 612), and may be mounted on a common motherboard or in other manners as appropriate. The processor can process instructions for execution within the computing device, including instructions stored in the memory 614 or on the storage device to display graphical information for a GUI on an external input/output device, such as a display 623 coupled to the high-speed interface 619. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 614 stores information within the computing device. In some implementations, the memory 614 is a volatile memory unit or units. In some implementations, the memory 614 is a non-volatile memory unit or units. The memory 614 may also be another form of computer-readable medium, such as a magnetic or optical disk.

The storage device is capable of providing mass storage for the computing device. In some implementations, the storage device may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor), perform one or more methods, such as those described above. The instructions can also be stored by one or more storage devices such as computer- or machine-readable mediums (for example, the memory 614, the storage device, or memory on the processor).

The high-speed interface 618 manages bandwidth-intensive operations for the computing device, while the low-speed interface manages lower bandwidth-intensive operations. Such allocation of functions is an example only. In some implementations, the high-speed interface 618 is coupled to the memory 614, the display 623 (e.g., through a graphics processor or accelerator), and to the high-speed expansion ports 619, which may accept various expansion cards (not shown). In the implementation, the low-speed interface is coupled to the storage device and the low-speed expansion port. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms, as shown in the figure. For example, it may be implemented as a standard server, or multiple times in a group of such servers. In addition, it may be implemented in a personal computer such as a laptop computer. It may also be implemented as part of a rack server system. Alternatively, components from the computing device may be combined with other components in a mobile device (not shown), such as a mobile computing device. Each of such devices may contain one or more of the computing device and the mobile computing device, and an entire system may be made up of multiple computing devices communicating with each other.

As a mobile computing device, system 600 includes a processor (e.g., CPUs 610), a memory 614, an input/output device such as a display 623, a communication interface 620, and a transceiver (not shown), among other components. The mobile computing device may also be provided with a storage device, such as a micro-drive or other device, to provide additional storage. Each of the processor, the memory 614, the display 623, the communication interface 620, and the transceiver, are interconnected using various buses (e.g., bus 612), and several of the components may be mounted on a common motherboard or in other manners as appropriate.

The processor can execute instructions within the mobile computing device, including instructions stored in the memory 614. The processor may be implemented as a chipset of chips that include separate and multiple analog and digital processors. The processor may provide, for example, for coordination of the other components of the mobile computing device, such as control of user interfaces, applications run by the mobile computing device, and wireless communication by the mobile computing device.

The processor may communicate with a user through a control interface 619 and a display interface (not shown) coupled to the display 623. The display 623 may be, for example, a TFT (Thin-Film-Transistor Liquid Crystal Display) display or an OLED (Organic Light Emitting Diode) display, or other appropriate display technology. The display interface may comprise appropriate circuitry for driving the display 623 to present graphical and other information to a user. The control interface 619 may receive commands from a user and convert them for submission to the processor. In addition, an external interface (not shown) may provide communication with the processor, so as to enable near area communication of the mobile computing device with other devices. The external interface may provide, for example, for wired communication in some implementations, or for wireless communication in other implementations, and multiple interfaces may also be used.

The memory 614 stores information within the mobile computing device. The memory 614 can be implemented as one or more of a computer-readable medium or media, a volatile memory unit or units, or a non-volatile memory unit or units. An expansion memory (not shown) may also be provided and connected to the mobile computing device through an expansion interface (not shown), which may include, for example, a SIMM (Single In Line Memory Module) card interface. The expansion memory may provide extra storage space for the mobile computing device, or may also store applications or other information for the mobile computing device. Specifically, the expansion memory may include instructions to carry out or supplement the processes described above, and may include secure information also. Thus, for example, the expansion memory may be provide as a security module for the mobile computing device, and may be programmed with instructions that permit secure use of the mobile computing device. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor), perform one or more methods, such as those described above. The instructions can also be stored by one or more storage devices, such as one or more computer- or machine-readable mediums (for example, the memory 614, the expansion memory, or memory on the processor). In some implementations, the instructions can be received in a propagated signal, for example, over the transceiver or the external interface.

The mobile computing device may communicate wirelessly through the communication interface 620, which may include digital signal processing circuitry where necessary. The communication interface 620 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver using a radio-frequency. In addition, short-range communication may occur, such as using a Bluetooth®, Wi-Fi™, or other such transceiver (not shown). In addition, a GPS (Global Positioning System) receiver module (not shown) may provide additional navigation- and location-related wireless data to the mobile computing device, which may be used as appropriate by applications running on the mobile computing device.

The mobile computing device may also communicate audibly using an audio codec, which may receive spoken information from a user and convert it to usable digital information. The audio codec may likewise generate audible sound for a user, such as through a speaker (e.g., speaker 612 or in a handset of the mobile computing device). Such sound may include sound from voice telephone calls, may include recorded sound (e.g., voice messages, music files, etc.) and may also include sound generated by applications operating on the mobile computing device.

The mobile computing device may be implemented in a number of different forms, as shown in the figure. For example, it may be implemented as a cellular telephone (not shown). It may also be implemented as part of a smartphone, personal digital assistant, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A method, comprising:
   signing onto a secure communications system by a client computing device, comprising:
      downloading a symmetrically encrypted data block from a server, wherein the encrypted data block comprises a server-stored secondary password and a server-stored shared-symmetric key;
      decrypting the encrypted data block with a locally-stored shared-symmetric key;
      signing onto at least one of a server or service using the server-stored secondary password by the client computing device;
      generating a secondary password, wherein the generated secondary password is different than the server-stored secondary password; and
      overwriting the server-stored secondary password with the generated secondary password after the client computing device has downloaded the symmetrically encrypted block comprising a server-stored secondary password and a server-stored shared-symmetric key from the server;
   sending a communication message, comprising:
      encrypting a message with the server-stored shared-symmetric key; and decrypting a received message with the server-stored shared-symmetric key; and transmitting every message to all devices in a device group, before displaying any message sent or received, comprising:

encrypting each message using a locally stored device group shared symmetric key known by all devices in the device group as an encrypted group message and transmitting the encrypted group message to all the devices in the device group, wherein upon receiving the encrypted group message, each device of the device group decrypts the encrypted group message with the locally stored device group shared symmetric key and displays the encrypted group message, encrypting the first encrypted message using a locally stored second device group shared symmetric key known by all devices in the second device group as a second encrypted group message and transmitting the second encrypted group message to all the devices in the second device group, wherein upon receiving the second encrypted group message, each device of the second device group decrypts the second encrypted group message with the locally stored second device group shared symmetric key and displays the second encrypted group message.

* * * * *